UNITED STATES PATENT OFFICE 2,167,632

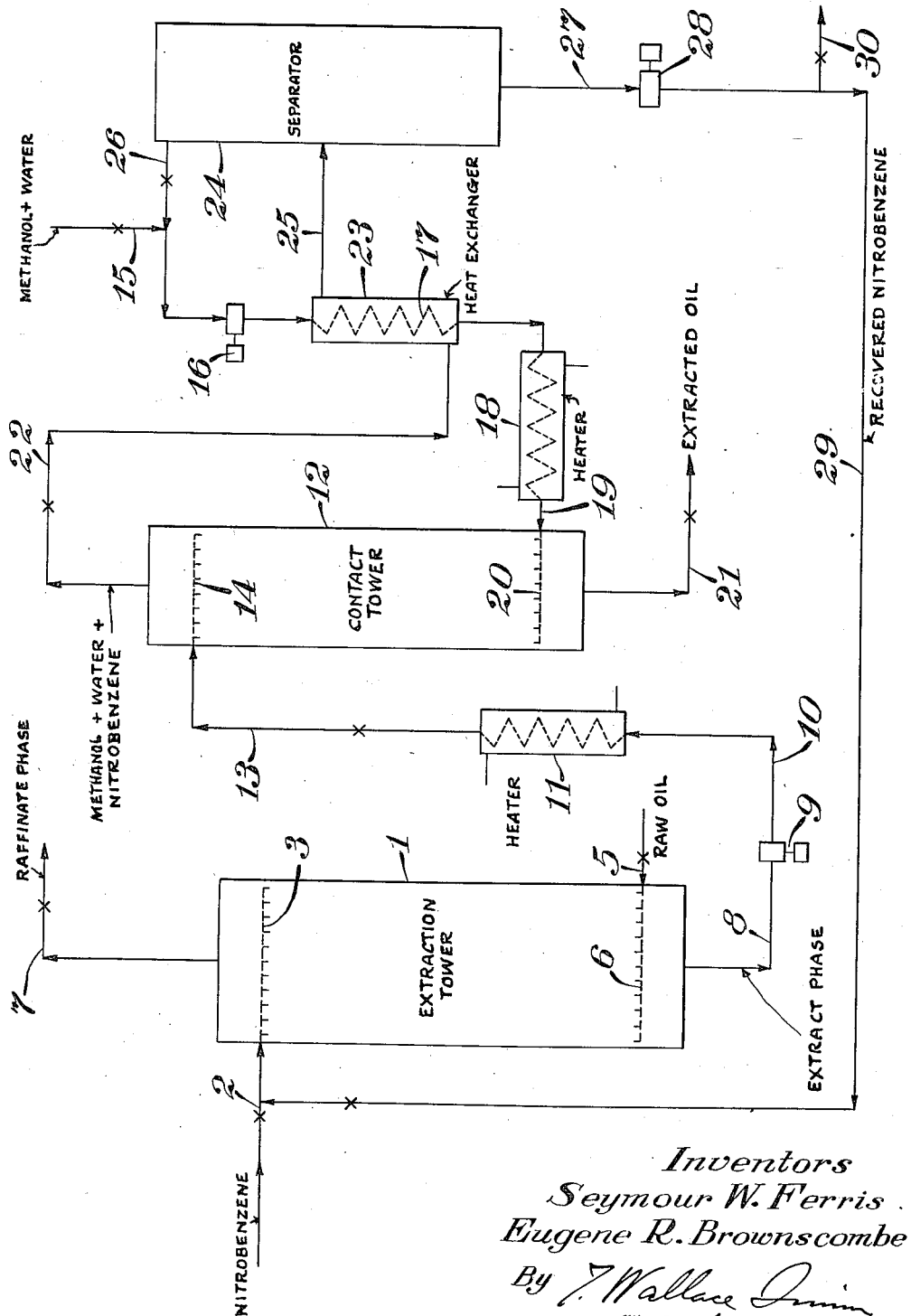

RECOVERY OF SOLVENT FROM HYDROCARBON OILS

Eugene R. Brownscombe and Seymour W. Ferris, Aldan, Pa., assignors to The Atlantic Refining Company, Philadelphia, Pa., a corporation of Pennsylvania Application July 18, 1936, Serial No. 91,342

11 Claims. (Cl. 260—645)

The present invention relates to the recovery of solvents from hydrocarbon oils, and relates more particularly to the separation and recovery of solvents such as the nitrated aromatic hydrocarbons, for example, nitrobenzene, nitrotoluene and the like, from oils which have been selectively extracted with such solvents.

A further object of this invention is the recovery of solvents, such as the nitrated aromatic hydrocarbons, from oil, whereby vaporization or distillation of the solvent is obviated or at least reduced to a minimum.

A further object of this invention is the recovery of nitrated aromatic hydrocarbons, and particularly nitrobenzene, from oils which have been selectively extracted with same, by means of a second solvent which at ordinary temperatures relatively immiscible with oil and nitrobenzene, and which, at elevated temperatures, possesses substantial solvent power for nitrobenzene but not for oil.

One of the major expenses incident to solvent extraction of hydrocarbon oils, and particularly petroleum lubricating oils, is the distillation of the solvent, most of which is present in the extract or naphthenic oil phase. In the recovery of solvents by distillation, the heat employed in vaporizing the solvent is seldom, if ever, recovered. However, in accordance with the present invention, heat losses are reduced to a minimum, since substantially all of the heating and cooling steps involve the handling of liquids without vaporization, and heat exchange may be employed with high efficiency.

Briefly, the present invention resides in an improved method of recovering selective solvents such as the nitrated aromatic hydrocarbons, for example, nitrobenzene, nitrotoluene and the like, from hydrocarbon oil which has been selectively extracted with the same. Hydrocarbon oils, and particularly lubricating oil stocks, are subjected to treatment with a nitrated aromatic hydrocarbon, such as nitrobenzene, to form a raffinate phase comprising the more paraffinic portion of the oil together with a minor quantity of solvent, and an extract phase comprising the more naphthenic portion of the oil in solution in the major portion of the solvent. The raffinate and extract phases are separated from one another, and either one or both of the phases are subjected to treatment with a second solvent for the removal of the nitrobenzene therefrom.

In the case of the recovery of the nitrated aromatic hydrocarbon, for example, nitrobenzene, the oil-nitrobenzene mixture is brought into contact with a second solvent, which at ordinary temperature, is relatively immiscible with the nitrobenzene and with oil, but which at elevated temperatures is substantially miscible with the nitrobenzene but not with oil. Among the suitable secondary solvents are the hydroxy compounds, preferably the aliphatic hydroxy compounds such as methyl alcohol, ethyl alcohol, propyl alcohol or mixtures of these alcohols with water, and the polyhydric alcohols such as ethylene glycol, propylene glycol, diethylene glycol and water, and the like. The contacting of the oil-nitrobenzene mixture with the second solvent, e. g., the hydroxy compound, is carried on at temperatures of the order of about 250° F. to about 400° F., under elevated pressure sufficient to maintain the second solvent in the liquid phase. At such temperatures the nitrobenzene is extracted from the oil to a substantial extent and a separate phase is formed comprising the hydroxy compound, the major portion of the nitrobenzene, and a small amount of oil. The remaining phase comprises essentially oil containing a small percentage of nitrobenzene and hydroxy compound. The phases are separated from one another, for example, by decantation, and that phase comprising the hydroxy compound and the major portion of the nitrobenzene is cooled, preferably to a temperature of the order of about 150° F. to 60° F., or less, whereupon the bulk of the nitrobenzene separates from the second solvent, e. g., the hydroxy compound. Each solvent may be recirculated without further treatment, i. e., the nitrobenzene to the primary extraction system and the hydroxy compound to the solvent recovery system.

As a further illustration of our process of solvent recovery, an extract solution from a nitrobenzene solvent extraction system, consisting of about 25 parts of naphthenic oil in solution in 75 parts of nitrobenzene, was admixed with 200 parts of ethylene glycol. At a temperature of about 80° F., very little nitrobenzene, and no measurable quantity of oil is dissolved in the ethylene glycol. When, however, the mixture is heated to about 320° F., a very large proportion of the nitrobenzene is dissolved by the ethylene glycol, leaving substantially all the oil, with a small amount of nitrobenzene, as the second phase. The two phases may be separated and the small quantity of nitrobenzene may be removed from the oil phase, for example, by steam stripping. The remaining phase, at about 320° F. comprises ethylene glycol, nitrobenzene and a very small proportion of oil. This solution, upon being cooled to about 150° F. or lower, forms two phases which stratify into layers and may be separated by any suitable means, such as decanting or centrifuging. One layer comprises nitrobenzene of a sufficiently high degree of purity that it may be recycled directly to the selective solvent extraction system to treat additional quantities of oil, whereas the other layer comprises ethylene glycol sufficiently free of nitrobenzene that it may be returned to the solvent recovery system for the separation of nitrobenzene from additional quantities of nitrobenzene-oil mixtures.

In order to more clearly describe our invention, reference is had to the accompanying drawing which illustrates diagrammatically a method of treating hydrocarbon oil with a selective solvent such as nitrobenzene and the recovery of the nitrobenzene for reuse in accordance with the procedure of our invention.

Referring to the drawing, a selective solvent such as nitrobenzene is introduced into the upper section of the extraction tower 1 by means of valve-controlled pipe 2 and distributing head 3, and a hydrocarbon oil, for example, a lubricating oil stock, is introduced into the lower section of tower 1 through valve-controlled pipe 5 and distributing head 6. The nitrobenzene, being of greater specific gravity than the oil, descends in countercurrent contact with the oil and the more naphthenic components of the oil pass into solution in the solvent, thus forming the extract phase, while the undissolved oil, containing a small portion of solvent and constituting the raffinate phase, is withdrawn from the top of the tower by means of valve-controlled pipe 7. The extract phase, comprising the bulk of the solvent and containing dissolved naphthenic components, is withdrawn from the bottom of the tower 1 through pipe 8 and is pumped by pump 9 through pipe 10 and heat exchanger 11 wherein the temperature of the extract solution is raised to about 350° F. The heated solution from exchanger 11 is introduced into the upper section of a second contacting tower 12 by means of valve-controlled pipe 13 and distributing head 14, and a second solvent, for example, 50% methanol–50% water, supplied through valve-controlled pipe 15, is pumped by pump 16 through heat-exchanger coil 17 and heater 18, heated to about 350° F., and passed through pipe 19 and distributing head 20 into the lower section of tower 12. Sufficient pressure is maintained within the system that the oil and solvents remain substantially in the liquid phase throughout the recovery operation. Countercurrent contacting of the heated extract and the methanol-water is effected in tower 12, the major portion of the nitrobenzene being dissolved from the extract by the methanol-water. The final extract oil, containing a relatively small quantity of nitrobenzene and methanol-water, is withdrawn from the bottom of tower 12 by means of valve-controlled pipe 21 and may be passed to a stripping still (not shown) wherein residual nitrobenzene and traces of methanol-water may be removed.

The second solvent, i. e., methanol-water, having dissolved the major portion of the nitrobenzene and a small amount of oil from the heated extract, is withdrawn from the top of tower 12 and passed through valve-controlled pipe 22 into heat-exchanger shell 23. Herein, heat-exchange with the methanol-water in coil 17 is effected, the methanol-water-nitrobenzene solution in shell 23 being cooled to a temperature of about 100° F., the methanol-water in the coil 17 absorbing the heat. The methanol-water-nitrobenzene mixture, at about 100° F., is passed from the exchanger shell 23 into separator 24 by means of pipe 25. The lowering of the temperature of the methanol-water-nitrobenzene mixture from about 350° F. to about 100° F. causes the formation of two phases, one comprising methanol-water containing a small percentage of nitrobenzene and oil, and the other, nitrobenzene and a small amount of methanol-water and oil. The two phases resulting from the cooling step are permitted to stratify into layers in separator 24, the methanol-water being withdrawn from the upper section of the separator by means of valve-controlled pipe 26 and recirculated to the recovery system by means of pump 16. The nitrobenzene containing a small amount of methanol-water and oil is withdrawn from the lower section of separator 24 through pipe 27 and recirculated by pump 28 through valve-controlled pipe 29 to the upper section of the extraction tower 1. In the operation of our solvent extraction and recovery system, it has been found that the equilibrium between the extraction solvent, for example, nitrobenzene, and the second or recovery solvent, for example, methanol-water, is practically constant. Or, in other words, there is substantially no build-up of methanol-water in the nitrobenzene in the primary extraction system, nor is there any build-up of nitrobenzene in methanol-water in the recovery system. In instances where the content of naphthenic oil in the recovered nitrobenezene may increase, it is desirable to remove at least a portion of such recovered solvent from the system, for example, by means of valve-controlled pipe 30, and subject the solvent to distillation to separate same from the oil. Such solvent, substantially free of oil, may be re-introduced into the primary extraction system through valve-controlled pipe 2.

While we have described our solvent recovery step with particular reference to the separation of solvent from the extract or naphthenic oil phase, we may also subject the raffinate or paraffinic oil phase to a similar treatment for the recovery of solvent therefrom. Furthermore, we have found that in lieu of methanol-water, we may employ ethyl alcohol, propyl alcohol, ethylene glycol, propylene glycol, butylene glycol, and diethylene glycol or mixtures of the alcohols with one another and/or with water. In the utilization of methyl and ethyl alcohol, it is generally desirable to dilute the alcohol with water to give, for example, mixtures containing 50% of alcohol and 50% of water, the water in the alcohol serving to decrease the miscibility of the mixture with hydrocarbon oil. The dilution need not be in the ratio of 1:1, since other proportions may be employed, depending upon the alcohol, and the temperature and pressure conditions in the recovery system. The primary oil extraction system and/or the solvent recovery system may be of the single stage continuous countercurrent type described with reference to the drawing, or may be of the multi-stage countercurrent type or simply of the batch type. However, it has been found that the countercurrent systems are preferable, particularly from the view point of efficiency and economy.

The following example is typical of the results which may be obtained in accordance with our invention:

100 bbls. per hour of an East Texas lubricating oil distillate having a Saybolt Universal viscosity of 110 seconds at 210° F., an A. P. I. gravity of 21.3°, and a viscosity-gravity constant of 0.854, was extracted in a 3-stage batch countercurrent extraction system at 68° F. with recovered nitrobenzene charged at a rate of 190 bbls. per hour. The recovered nitrobenzene solvent was composed of 88.5% of nitrobenzene, 7.9% of ethylene glycol and 3.6% of oil. There was produced a yield of 57.2 bbls. per hour of raffinate phase consisting of 85.6% raffinate oil, 14% nitrobenzene and 0.4 ethylene glycol. Upon removal of the solvents from the raffinate phase, for example, by distillation and/or steam stripping, there resulted a yield of 49 bbls. per hour of raffinate oil having a Saybolt Universal viscosity of 83 seconds at 210° F., an A. P. I. gravity of 27.3°, and a viscosity-gravity constant of 0.814. The extract phase withdrawn from the primary extraction system amounted to 233 bbls. per hour and comprised a solution of 68.7% nitrobenzene, 6.4% ethylene glycol and 24.9% naphthenic oil. This extract phase was charged at the rate of 233 bbls. per hour to a 3-stage batch countercurrent extraction system and contacted at about 340° F. with a second or recovery solvent charged at a rate of 327 bbls. per hour. The second or recovery solvent was composed of 87.8% of ethylene glycol and 12.2% of nitrobenzene. There resulted from this contacting operation a yield of 75 bbls. per hour of a naphthenic oil solution consisting of 68% oil, 26.6% nitrobenzene and 5.4% ethylene glycol, from which was recovered, after removal of the solvent by distillation, a naphthenic oil fraction amounting to 51 bbls. per hour and having a Saybolt Universal viscosity of 168 seconds at 210° F., an A. P. I. gravity of 16.4°, and a viscosity-gravity constant of 0.887. The other phase resulting from this contacting operation amounted to 485 bbls. per hour and comprised a solution of 37.1% of nitrobenzene, 61.5% ethylene glycol and 1.4% oil. This solution was cooled to about 150° F. and permitted to settle, whereupon there was formed a two-layer system, one phase consisting of 87.8% of ethylene glycol and 12.2% of nitrobenzene, which phase was recirculated as the second solvent to the solvent recovery system at the rate of 327 bbls. per hour. The remaining phase, consisting of 88.6% nitrobenzene, 6.6% ethylene glycol and 4.8% oil, and amounting to 158 bbls. per hour, was added to the small quantity of solvents stripped from the raffinate and extract oil fractions, and the composite solvent, predominantly nitrobenzene, was recirculated to the primary oil extraction system to extract additional quantities of untreated oil.

It will be seen that, in accordance with our invention, it is possible to recover the major portion of the primary solvent, e. g., nitrobenzene, from oil fractions substantially entirely in the liquid phase, thus eliminating, for the most part, the necessity for distillation. Furthermore, since the recovery of solvent is accomplished in the liquid phase, heat exchange in the heating and cooling steps may be employed with high efficiency.

Herein, and in the appended claims, the term "nitrated aromatic hydrocarbon" is to be understood to comprehend nitrobenzene, nitrotoluene, nitronaphthalene and the like or mixtures thereof. Also, the term "aliphatic alcohol" is to be understood to comprehend methyl alcohol, ethyl alcohol, propyl alcohol or mixtures of same with one another or with water, as well as the polyhydric alcohols such as ethylene glycol, propylene glycol, butylene glycol, diethyline glycol, and mixtures thereof with one another and/or with water and/or the monohydric alcohols.

What we claim is:

1. The method of recovering a nitrated aromatic hydrocarbon from admixture with hydrocarbon oil, which comprises contacting the nitrated aromatic hydrocarbon and oil, at a temperature of from about 250° F. to about 400° F., with a solvent, which at temperatures of from about 250° F. to 400° F. has substantial solvent power for the nitrated aromatic hydrocarbon but not for oil, and which at temperatures less than about 150° F. has relatively little solvent power for the nitrated aromatic hydrocarbon and for oil, effecting separation of the oil constituents from the nitrated aromatic hydrocarbon while maintaining the mixture at said elevated temperature, removing separated oil, and cooling the remaining mixture to separate and recover the nitrated aromatic hydrocarbon.

2. The method of recovering a nitrated aromatic hydrocarbon from admixture with hydrocarbon oil, which comprises contacting the nitrated aromatic hydrocarbon and oil, at a temperature of from about 250° F. to about 400° F., with a solvent, which at temperatures of from about 250° F. to 400° F. has substantial solvent power for the nitrated aromatic hydrocarbon but not for oil, and which at temperatures less than about 150° F. has relatively little solvent power for the nitrated aromatic hydrocarbon and for oil, effecting separation of the oil constituents from the nitrated aromatic hydrocarbon while maintaining the mixture at said elevated temperature, removing separated oil, and cooling the remaining mixture to a temperature of less than substantially 150° F. to separate and recover the nitrated aromatic hydrocarbon.

3. The method of recovering a nitrated aromatic hydrocarbon from admixture with hydrocarbon oil, which comprises contacting the nitrated aromatic hydrocarbon and oil with an aliphatic alcohol at a temperature of from about 250° F. to about 400° F., effecting separation of the oil constituents from the nitrated aromatic hydrocarbon while maintaining the mixture at substantially such temperature, removing the separated oil, and cooling the remaining mixture to separate and recover the nitrated aromatic hydrocarbon.

4. The method of recovering a nitrated aromatic hydrocarbon from admixture with hydrocarbon oil, which comprises contacting the nitrated aromatic hydrocarbon and oil with an aliphatic alcohol at a temperature of from about 250° F. to about 400° F., effecting separation of the oil constituents from the nitrated aromatic hydrocarbon while maintaining the mixture at substantially such temperature, removing the separated oil, and cooling the remaining mixture to a temperature of less than substantially 150° F. to separate and recover the nitrated aromatic hydrocarbon.

5. The method of recovering a nitrated hydrocarbon from admixture with hydrocarbon oil, which comprises contacting the nitrated aromatic hydrocarbon and oil with a diluted aliphatic alcohol at a temperature of from about 250° F. to about 400° F., effecting separation of the oil constituents from the nitrated aromatic hydrocarbon while maintaining the mixture at substantially such temperature, removing the separated oil, and cooling the remaining mixture to separate and recover the nitrated aromatic hydrocarbon.

6. The method of recovering a nitrated aromatic hydrocarbon from admixture with hydrocarbon oil, which comprises contacting the nitrated aromatic hydrocarbon and oil with a diluted aliphatic alcohol at a temperature of from about 250° F. to about 400° F., effecting separation of the oil constituents from the nitrated aromatic hydrocarbon while maintaining the mixture at substantially such temperature, removing the separated oil, and cooling the remaining mixture to a temperature of less than substantially 150° F. to separate and recover the nitrated aromatic hydrocarbon.

7. The method of recovering nitrobenzene from admixture with hydrocarbon oil, which comprises contacting the nitrobenzene and oil with an aliphatic alcohol at a temperature of from about 250° F. to about 400° F., effecting separation of the oil constituents from the nitrobenzene while maintaining the mixture at substantially such temperature, removing the separated oil, and cooling the remaining mixture to separate and recover the nitrobenzene.

8. The method of recovering nitrobenzene from admixture with hydrocarbon oil, which comprises contacting the nitrobenzene-oil mixture with at least one solvent from the group consisting of glycols and diluted monohydric aliphatic alcohols, at a temperature of from about 300° F. to about 350° F., effecting separation of the oil constituents from the nitrobenzene while maintaining the mixture at substantially such temperature, removing the separated oil, and cooling the remaining mixture to a temperature of from about 60° F. to about 150° F. to separate and recover the nitrobenzene.

9. In the process of extracting hydrocarbon oil with nitrobenzene to form a raffinate phase comprising the more paraffinic oil components and a minor quantity of nitrobenzene, and an extract phase comprising the more naphthenic oil components and a major quantity of nitrobenzene, the steps which comprise contacting at least one of said phases with an aliphatic alcohol at a temperature of from about 250° F. to about 350° F., effecting separation of oil constituents from the nitrobenzene-alcohol mixture at such temperatures, removing the separated oil, cooling the nitrobenzene-alcohol mixture to a temperature less than substantially 150° F. to effect separation of the nitrobenzene from the alcohol, removing the separated nitrobenzene and recirculating at least a portion thereof to the hydrocarbon oil extraction system.

10. The method of recovering a nitrated aromatic hydrocarbon from admixture with hydrocarbon oil, which comprises contacting said admixture with a solvent for said nitrated aromatic hydrocarbon at a temperature such hat the nitrated aromatic hydrocarbon is extracted to a substantial extent from the oil, separating oil from the solution of the nitrated aromatic hydrocarbon and solvent, and cooling said solution to separate and recover the nitrated aromatic hydrocarbon.

11. The method of recovering a nitrated aromatic hydrocarbon from admixture with hydrocarbon oil, which comprises contacting said admixture, at a temperature such that the nitrated aromatic hydrocarbon is extracted to a substantial extent from the oil, with a solvent, which, at said temperature, has substantial solvent power for said nitrated aromatic hydrocarbon but not for oil, separating oil from the solution of the nitrated aromatic hydrocarbon in said solvent, and cooling said solution to separate and recover the nitrated aromatic hydrocarbon.

EUGENE R. BROWNSCOMBE.
SEYMOUR W. FERRIS.